(12) United States Patent
Newell et al.

(10) Patent No.: US 10,747,834 B2
(45) Date of Patent: Aug. 18, 2020

(54) SOCIAL FITNESS EVENTS

(71) Applicant: EchoStar Technologies L.L.C., Englewood, CO (US)

(72) Inventors: Nicholas Newell, Centennial, CO (US); Prakash Subramanian, Mumbai (IN); Ryan Hinrichs, Rapid City, SD (US); Ribhav Agarwal, Kanpur (IN)

(73) Assignee: DISH Technologies L.L.C., Englewood, CO (US)

( * ) Notice: Subject to any disclaimer, the term of this patent is extended or adjusted under 35 U.S.C. 154(b) by 329 days.

(21) Appl. No.: 15/840,851

(22) Filed: Dec. 13, 2017

(65) Prior Publication Data

US 2019/0179964 A1 Jun. 13, 2019

(51) Int. Cl.
| | | |
|---|---|---|
| *G06F 16/00* | (2019.01) | |
| *G06F 16/9535* | (2019.01) | |
| *G06F 16/25* | (2019.01) | |
| *G06Q 50/00* | (2012.01) | |

(52) U.S. Cl.
CPC ........ *G06F 16/9535* (2019.01); *G06F 16/252* (2019.01); *G06Q 50/01* (2013.01)

(58) Field of Classification Search
CPC .... G06F 16/9535; G06F 16/262; G06F 16/00; G06F 17/3056; G06F 17/30867; G06F 17/30; G06F 16/24535; G06F 16/24539; G06F 17/30451; G06Q 50/01
See application file for complete search history.

(56) References Cited

U.S. PATENT DOCUMENTS

2010/0228602 A1* 9/2010 Gilvar ............... G06Q 30/0252
  705/14.5
2015/0262131 A1* 9/2015 Mermelstein ...... G06Q 10/1095
  705/5

* cited by examiner

*Primary Examiner* — Anh Ly
(74) *Attorney, Agent, or Firm* — Wash Park IP Ltd.; John T. Kennedy

(57) ABSTRACT

Apparatus, systems, processes, and computer-readable mediums for organizing, facilitating, monitoring, and obtaining feedback for social fitness events are provided. For at least one embodiment, a system includes an events module, configured to interface with a remote events database including one or more event records; a person module configured to interface with a local first database including two or more first records, wherein each of the two or more first records identify each of two or more persons; a devices module configured to interface with a local second database including at least one second record, wherein each of the at least one second records identifies a device communicatively coupled to the processor using an IoT tag; a services module configured to interface with a remote third database including at least one third record; and a facilities module configured to interface with a remote fourth database including at least one fourth record.

20 Claims, 3 Drawing Sheets

SOCIAL FITNESS EVENTS

TECHNICAL FIELD

The technology described herein generally relates to devices, systems, and methods for interconnecting devices, systems, facilities, and people in social environments. More specifically, the various embodiments disclosed generally relate to a computer systems and methods directed to facilitating, organizing, monitoring, and obtaining feedback for social fitness events, where such invents include the use of one or more interconnected Internet-of-Things (IoT) devices, other devices, services, facilities, and persons.

BACKGROUND

Today, humans have as great of a need as ever for in-person (i.e., "live"—as distinguished from remote or virtual) social interactions with others. Yet, many of today's technological advances, such as the Internet, social media, virtual reality and otherwise often present a simpler, yet often non-ideal, form of social interaction for many. That is, instead of meeting with someone live (in-person) for coffee, such interactions may occur over the Internet, for example, using social media. Further, many persons today lead increasingly hectic, chaotic, and often stressed lives. Such stresses arise from work, family and other commitments and often inhibit such persons from having the opportunity to meet up live with others in a social or other environment. Further, determining the who, what, where, how, and when of a social or other interaction can occur often is very time consuming. For example, determining when two or more persons are available for lunch, at a restaurant acceptable to each such person, and at a time and location so acceptable can often involve numerous exchanges of text messages, phone calls, emails, or otherwise. That is, the simple planning of a lunch "date" can often involve a significant time commitment before the "data" even occurs. Further, who pays for such a "date" can also often present stresses upon the attendees. For example, is it a first person's turn, and if so, what is an acceptable price range? Likewise, what attire is desired for the "date"? These are just a few of the many issues and questions that may arise today that discourage and/or inhibit the live social interaction of two or more persons.

Likewise, it is often desirable for multiple persons, i.e., more than two, to get together for social events. Whether such an event be a celebration (e.g., of a birthday, graduation, marriage or otherwise), a party, or simply a family meal, when multiple persons are to come together live, the stresses of planning, organizing, and facilitating such event often increase substantially. Such stresses may include, for example, scheduling, financial, location, logistics, and others.

Yet, a need exists to address such stresses today. Further, a need exists for systems, devices and methods which utilize the vast information databases and interconnectivity of devices, locations, people, and others to organize, facilitate, monitor and obtain feedback for live social fitness events. These and other needs are addressed by the present disclosure. The various embodiments of the present disclosure are directed to using available technologies, such as calendaring, IoT, and social media, and others to make it easier to engage in "live" social interactions.

SUMMARY

The various embodiments of the present disclosure relate in general to apparatus, systems, processes, and computer-readable mediums for use in organizing, facilitating, monitoring, and obtaining feedback for social fitness events.

In accordance with at least one embodiment of the present disclosure, a system organizing, facilitating, monitoring, and obtaining feedback for a social fitness event may include a first database, a processor, coupled to the first database and an events database. For at least one embodiment, the processor may have access to one or more non-transitory processor readable instructions, including instructions for executing a first application configured to instruct the processor to perform computer executable operations. The operations may include identifying an event. For at least one embodiment, the event may be listed in an events database and include an event characteristic. The operations may include identifying, using the first database, a first person and a second person. The operations may include verifying, using the first database, the first person and the second person are interested in attending the event. The operations may include facilitating the event for the first person and the second person. For at least one embodiment, the first database may include two or more first records. A first-first record may uniquely identify a first person and a second-first record may uniquely identify a second person. For at least one embodiment, each of the first-first record and second-first record may include a first characteristic, such as a calendar. The first characteristic may include a preference for events matching the event characteristic. For at least one embodiment, the system may include a communications interface coupling the processor to the events database.

For at least one embodiment, the system may include a second database including a second record. The second record may uniquely identify a first device. The second record may include a second characteristic which indicates a device type. The first application may be configured to instruct the processor to perform computer executable operations for determining a device type useful in facilitating the event, and when the second characteristic for the device matches the determined device type useful in facilitating the event, selecting the first device for use during the event.

For at least one embodiment, the second characteristic may include at least one permission identifying whether at least one of the first person and the second person have access to the device. For at least one embodiment, the first application may be configured to instruct the processor to perform the selecting operation in view of the at least one permission.

For at least one embodiment, the system may include a third database, coupled to the processor, and including a third record. The third record may uniquely identify a first service and may include a third characteristic indicating a service type provided by the first service. The first application may be configured to instruct the processor to perform computer executable operations including determining a service type useful in facilitating the event, and when the service characteristic for the service matches the determined service type useful in facilitating the event, selecting the first service for use during the event.

For at least one embodiment, the system may include a fourth database, coupled to the processor, including a fourth record. The fourth record may uniquely identify a first facility and include a fourth characteristic indicating a facility type. The first application may be configured to instruct the processor to perform computer executable operations including determining a facility type useful in facilitating the event, and when the fourth characteristic for the facility matches the determined facility type useful in facilitating the event, selecting the first facility for use during the event.

For at last one embodiment, a communications interface may couple the processor to the third database and to the fourth database over a wide area network.

For at least one embodiment, the system may include use of a second device available for use during the event. A second-second record may identify the second device and include at least one second characteristic of the device. The second characteristic may include an availability identifier. The first application may be configured to instruct the processor to perform computer executable operations including selecting at least one of the first device and the second device based upon the availability identifier associated with each of the first device and the second device.

For at least one embodiment, a second service may be available for use during the event. A second-third record may identify the second service and include at least one third characteristic. The third characteristic may include an availability identifier. The first application may be configured to instruct the processor to perform computer executable operations including selecting at least one of the first device, the second device, the first service, and the second service based upon the availability identifiers associated with respectively each of the first device, the second device, the first service, and the second service.

For at least one embodiment, a second facility may be available for use during the event. A second-fourth record may identify the second facility and include at least one of fourth characteristic including an availability identifier. The first application may be configured to instruct the processor to perform computer executable operations including selecting at least one of the first device, the second device, the first service, the second service, the first facility and the second facility based upon the availability identifiers associated with respectively each of the first device, the second device, the first service, the second service, the first facility and the second facility.

For at least one embodiment, the first application may be configured to instruct the processor to perform computer executable operations including determining a preference for each of the first person and the second person for each of the first device, the second device, the first service, the second service, the first facility and the second facility. The operations may also include determining a best match of devices, services, and facilities in view of the determined preferences for the event.

For at least one embodiment, an event is a social fitness event. For at least one embodiment, a first device may be configured with an Internet-of-Things tag.

In accordance with at least one embodiment of the present disclosure, a computer process organizing, facilitating, monitoring, and obtaining feedback for a social fitness event may include computer executable instructions for executing a first application using a processor configured to execute a first application program using one or more computer processor-readable instructions.

For at least one embodiment, the process may also include use of an event database identifying one or more event characteristics for at least one event. A first database may be used that identifies one or more first characteristics about two or more persons. The first database may be electronically coupled to the processor. A second database identifying one or more second characteristics about one or more devices may be used. Each of the one or more devices may be electronically coupled to the processor. A third database identifying one or more third characteristics about one or more services may be used. Each of the one or more services nay be electronically coupled to the processor. A fourth database identifying one or more fourth characteristics about one or more facilities may be used. Each of the one or more facilities may be electronically coupled to the processor.

For at least one embodiment, during execution of the first application, the process may include executing computer processor executable operations for initially identifying, from the second database, at least one of the one or more devices for use with the social fitness event. The operations may include initially identifying, from the third database, at least one of the one or more services for use with the social fitness event. The operations may include initially identifying, from the fourth database, at least one of the one or more facilities for use with the social fitness event. The operations may include verifying at least two of the two or more persons are interested in attending the social fitness event.

For at least one embodiment and upon verifying that at least two of the two or more persons are interested in attending the social fitness event, the process may include, executing computer processor executable operations for selecting at least one device for use during the social fitness event. The operations may include selecting at least one service for use during the social fitness event. The operations may include selecting at least one facility for use during the social fitness event. The selection of the at least one device, at least one service and at least one facility may occur iteratively in view of at least one first characteristic associated with at least one of the two or more persons interested in attending the event.

For at least one embodiment, a first characteristic may include a preference. The selection of the at least one device may occur in view of at least one second characteristic. For at least one embodiment, a second characteristic may be communicated to the processor using at least one IoT tag.

For at least one embodiment, the process may include monitoring the social fitness event as it occurs. The process may include utilizing feedback from at least one person during at least one of the organizing and an occurrence of the social fitness event.

In accordance with at least one embodiment of the present disclosure, a computer process organizing, facilitating, monitoring, and obtaining feedback for a social fitness event may include use of a non-transitory processor-readable medium providing processor-readable instructions configured to cause one or more processors to execute an application program for use in organizing a social fitness event. The processor-readable instructions may include instructions for execution by the one or more processors in a distributed system having one or more local databases and one or more remote databases.

For at least one embodiment, the application program may include an events module, configured to interface with a remote events database including one or more event records. The application program may include a person module configured to interface with a local first database including two or more first records, wherein each of the two or more first records identify each of two or more persons. The application program may include a devices module configured to interface with a local second database including at least one second record. For at least one embodiment, a second record may identify a device communicatively coupled to the processor using an IoT tag. The application program may include a services module configured to interface with a remote third database including at least one third record. The application program may include a facilities module configured to interface with a remote fourth database including at least one fourth record.

For at least one embodiment, a first record may include at least one first characteristic associated with a person. A second record may include at least one second characteristic associated with a service. A third record may include at least one third characteristic associated with a facility. A first, second and third record may be accessible to the processor using at least one computing network.

BRIEF DESCRIPTION OF THE DRAWINGS

The features, aspects, advantages, functions, modules, and components of the devices, systems and methods provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems, and processes for utilizing information databases, and the interconnectivity of devices including, but not limited to IoT devices, locations, services, and people to organize, facilitate, monitor, and obtain feedback for social fitness events.

As discussed above and as used herein, a "social fitness event" is a gathering of two or more persons in their physical (as opposed to virtual or on-line) form for any or no purpose. A social fitness event necessarily includes two in-person, physically present (i.e., "live") participants. However, it is to be appreciated that other persons may attend in a remote or virtual capacity. For example, a child's birthday party may include live participants, such as the child honoree and a parent, as well as non-live participants, such as a deployed parent attending virtually or otherwise.

The types of social fitness events to which the various embodiments of the present disclosure are addressed are limitless and unbounded. Non-limiting examples, include watch parties (e.g., a Super Bowl party, television show premieres and the like), celebrations (e.g., birthday, anniversary, retirement, promotions, marriage, engagements, and funerals), outings (e.g., hiking, skiing, cycling, golf, tennis, movie nights, dinners, whale watching, vacations, and the like), hanging-out (e.g., non-structured get togethers that may be pre-planned or arise nearly spontaneously), and any other type of event in which two or more persons attend in-person. Further, while the various non-limiting embodiments discussed herein are generally directed to events geared towards two or more persons social life, it is to be appreciated that such embodiments may also be directed to and/or used in furtherance of non-social life events such as work, charitable, political, or otherwise.

Further, as used herein a "device" is defined to be any device or resource, arising any in physical or virtual form that is useful for a given social fitness event. It is to be appreciated that a "device" may exist in the physical and/or virtual domains. For example, a birthday party may include the use of physical devices such as cakes, toys, and otherwise as well as virtual devices, such as the communications spectrum used to facilitate remote attendance at the social fitness event by a non-live person, such as a deployed family member attending virtually via a remote video conferencing link. That is, as used herein "devices" may include the use of physical and non-physical devices.

Figure 1:
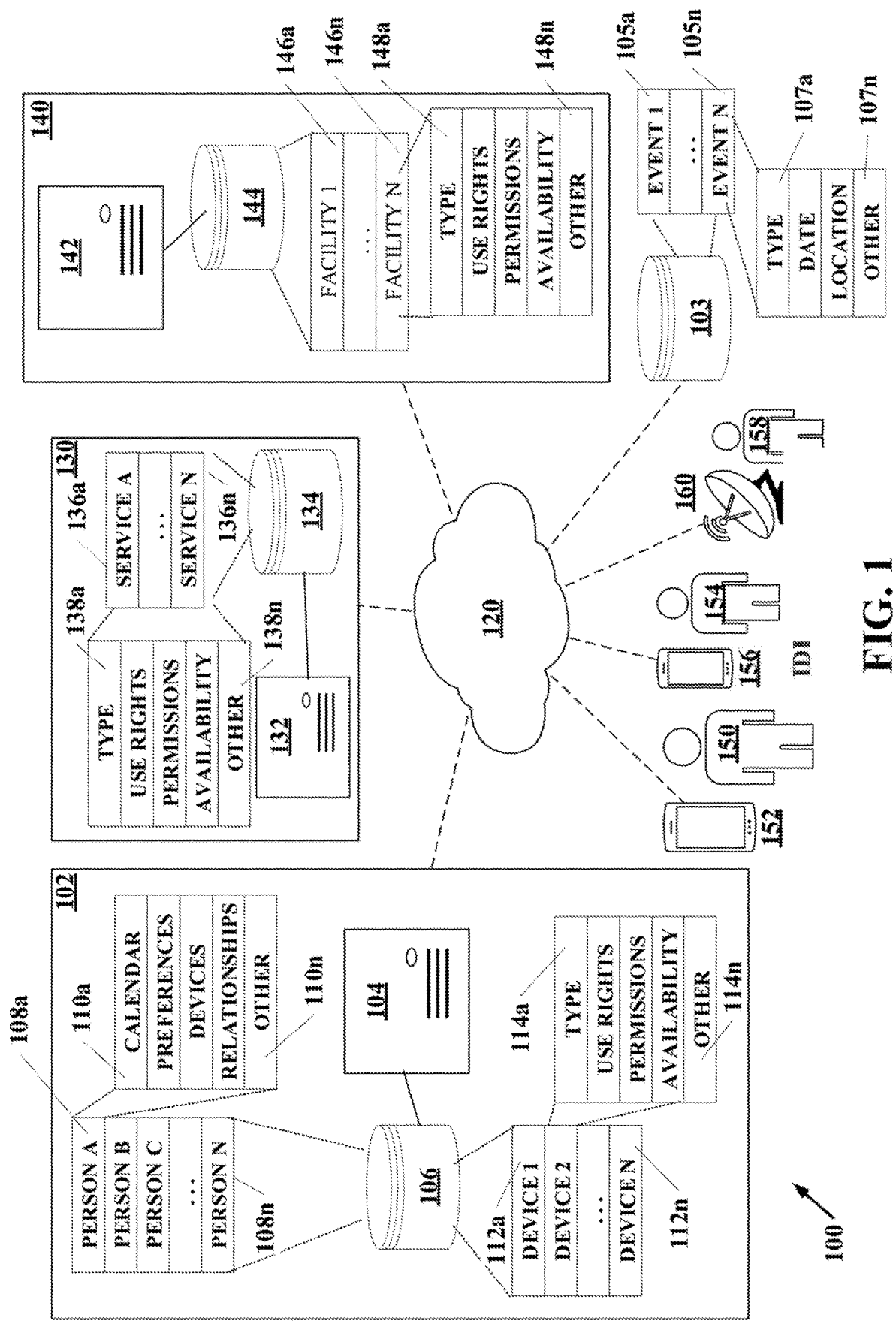
FIG. 1 is schematic representation of a system for facilitating, organizing, and monitoring social fitness events in accordance with at least one embodiment of the present disclosure.

As shown in FIG. 1 for at least one embodiment of the present disclosure, a system 100 for facilitating, organizing, and monitoring live social fitness events may include a first/social fitness application 102 having a combination of hardware and software components, which may be distributed, centralized, dedicated, non-dedicated, local, remote, virtualized, physical, or otherwise configured to facilitate the organizing and monitoring of live social fitness events. The social fitness application 102 may include a first/social fitness server 104 communicatively coupled to one or more event(s) databases 103.

The event(s) database 103 may be any database that identifies any event that two or more persons may be interested in attending. The event(s) database 103 may identify events by one or more event records 105 including one or more event characteristics 107, such as type, location, restrictions, requirements, or otherwise. Non-limiting examples of event(s) databases include ticket databases, program guides, restaurant guides, local event calendars, "to do" listings for any given area, or otherwise. The event(s) databases 103 may be provided on any hardware or software system and may local or remote to the first application 102 and communicatively coupled thereto using any known or later arising technologies. One or more elements of one or more event(s) databases may be saved on a separate database, associated with the first application for one or more embodiments.

The first application is also communicatively coupled to a first/social fitness database 106. It is to be appreciated that the first application 102, first server 104, and first database 106 and other servers, databases and applications and other computing components described or inherent to the various embodiments described herein may be configured using any known or hereafter arising configurations using any technologies including the use of hardware and software modules containing computer coded instructions assembled, compiled, or otherwise processed which further the configuration and use of one or more embodiments of the present disclosure. As used herein a device, system, component, or other element arising in hardware or software may be coupled to another device, system, component or other element by use of direct and indirect connections. Such connections may include local networks (such as Local Area Network, LAN), wide area networks (such as the Internet), private network, public networks, remote connections, or otherwise. Such connections may be provided using any known or hereafter arising communications technologies.

For at least one embodiment, the first application 102 may include one or more first/person records 108. A first record 108 may be provided for any entity, such as a person, an organization, a service, a trade group, a collection of any of the foregoing, or otherwise. A first record 108 may exist for any person or entity desiring to use the system 110 to facilitate, organize, participate, or otherwise engage in a social fitness event in accordance with an embodiment of the present disclosure. The first record 108 may exist in any form, structure, or database, for any period, and may be controlled by any entity. For at least one embodiment, at least one of the first records is maintained by a provider of the services facilitated by the social fitness application 102. For at least one embodiment, at least one of the first records is maintained by a third party social media service provider, such as FACEBOOK, GOOGLE, APPLE, and others. For at least one embodiment, at least one of the first records is maintained, in part, by each of two or more service providers. For at least one embodiment, a first record 108 is generated when a user first desires to use the first application or is designated as an entity that provides goods or services or derives a benefit from the first application 102 and/or is identified to the first application 102.

For at least one embodiment, each first record 108 may be configured to include and/or have access to one or more first characteristics 110. Such first characteristics 110 may vary from person to person, entity to entity, or otherwise (hereafter, generally and not in a limiting manner, entities and persons are referred to by the term "person") and/or for a given person over any period, and based upon one or more static or dynamic factors related to such person. Examples of such first characteristics 110 may include a person's demographics, calendar (availability, conflicts, and the like), preferences, devices known to be associated with and/or associable with the person, relationships, contacts, habits, desires, wants, and any other characteristic information. Such characteristic information may be obtainable from one or more databases. Such databases may be centralized or disparate, and access to such information may be provided real-time or in advance by the given person. For example, a person's availability may be specified in a Microsoft OUTLOOK, a GOOGLE, or an APPLE calendar application and related data records, while a person's preferences may be specified in a social media application, such as FACEBOOK. The devices associated with or associable with a person may be specified in a database specifying device identifiers, such as an IoT library identifying IoT devices (and data available from such devices), in a given person's home, work location, or otherwise. In short, a first record 108 may include any combination of information about a given person, where such information may be utilized by the first application 102 to facilitate, organize, monitor, and obtain feedback for a social fitness event.

As further shown in FIG. 1, the first application 102 may include one or more second/device records 112. A second record 108 may exist for any device accessible by the first application 102 for use in facilitating, organizing, and monitoring a social fitness event in accordance with an embodiment of the present disclosure. The second record 112 may exist in any form, structure, or database, for any period, and may be controlled by any entity. For at least one embodiment, at least one of the second records 112 is maintained for a first device 152 owned or under the control of a given person, such as first person 150. Similarly, a second record may exist for a second device 156 owned or under the control of a second person, such as second person 154. Similarly, a third record may exist for third device 160 owned or under the control of a third person, such as third person 158. One or more of the first person 150, second person 154 and third person 158 may be remote or local to any other of the first, second or third persons 152/154/158 with respect to a given social fitness event. The devices 152, 156, 160 may be any type of device that is associable with at least one person and capable of being communicatively coupled to the first application 102 via any communications medium(s).

Further, a device record 112 may exist for a device that is not owned or under the control of a person desirous of attending or designated for attendance at a social fitness event. Such devices may be owned and/or controlled by non-attending persons such as equipment providers, friends, neighbors, or otherwise. That is, it is to be appreciated that a device need not have a specific relationship to a person attending a social fitness event for such device to be utilized in conjunction with a given social fitness event, provided reservation and use of the device for the social fitness event can be realized.

As further shown in FIG. 1A for at least one embodiment of the present disclosure, a second record 112 associated with a device may include one or more second/device characteristics 114. Non-limiting examples of such second characteristics 114 may include a device type, capabilities, an identifier, one or more use rights or conditions, permissions, availability, and other characteristics. It is to be appreciated that the second characteristics 114 associated with a given device, as designated by a second record 112, may be unique or generic to such device and may be fixed, configurable, or vary over time. For example, a quantity of a device, such as jug of milk, may vary over a period as milk is consumed and replaced. The second characteristic 114 may be configured to update, dynamically, real-time, or on some other schedule, interval, or basis the characteristics of the device to reflect a current status of such device (e.g., the location of the milk jug in person's refrigerator) and the characteristics of such device (e.g., the quantity of milk therein at a given time). It is to be appreciated that one or more of the characteristics associated with a device may be private, public, quasi-private (e.g., where dissemination is limited to certain person(s)), or otherwise.

Further, a device may be connected to a network by any known or later arising technology. For example, a device may include an IoT tag. A non-limiting example of such a tag is a SIMPLELINK™ sensor tag manufactured by Texas Instruments Corporation. It is to be appreciated that an IoT tag or similar element may be configured to provide identification and/or information ("characteristics") about a device, such as its location, condition, status or otherwise as well as facilitating connection between the tagged device and a data or communications network. For at least one embodiment, such information may be provided in a second characteristic 114 associated with a second record 112 for a device. Such information may be accessible, in whole or in part, by the first application 102.

Further, it is to be appreciated that a device may be a "smart device", such as smart refrigerator configured to monitor the contents of a given person's refrigerator. Such a smart device may also include connectivity to one or more IoT tagged devices, as desired for any given embodiment of the present disclosure. Accordingly, it is to be appreciated that the first application 102 may be configured to have access to one or more first records 108, specifying one or more first characteristics 110 about a person and to one or more second records 112, specifying one or more second characteristics 114 about a device—such persons and/or devices being capable of being considered by the first application 102 in conjunction with the facilitating, organizing, monitoring, and obtaining feedback for a social fitness event.

As further shown in FIG. 1, the system 100 may also include the configuring and/or use of one or more second applications 130. As used herein for descriptive purposes only and not in a limiting manner, a second application 130 may be utilized to provide information and access to devices, services, facilities or otherwise maintained and/or controlled by a third-party entity and not directly by an entity operating or configured to operate in conjunction with the first application 102. For example, the system 100 may include access to pre-existing service providers, such as transportation providers (e.g., UBER and LYFT), vendors (e.g., restaurants—both dine-in and delivery), and others. The first application 102 may access these pre-existing second/service applications 130, via the Internet or other communications medium(s), to facilitate, organize, monitor, and obtain feedback for social fitness events. For example, when organizing an event, a need may be recognized for transportation for one or more persons to and from the event. Such transportation may involve the use of transportation service providers. The first application 102 may be configured to identify a second application 130 providing such services, establish communications with a second server 132 executing, in whole or in part, such second application 130, and reserve the desired services.

It is to be appreciated that such services may be designated in one or more second databases 134. Such second databases 134 may include one or more third/service records 136 that are associated with a given service and have one or more third/service characteristics 138 associated therewith. Further, a first characteristic 110 may designate service providers preferred and non-preferred by a person. Non-limiting examples of such third characteristics 138 may include a service type, capabilities, an identifier, one or more use rights or conditions, permissions, availability, and other characteristics. It is to be appreciated that the third characteristics 138 associated with a given service, as designated by a third record 136, may be unique or generic to such service and may be fixed, configurable, or vary over time. For example, a quantity of a service, such as a transportation service, may specify a type of driver (e.g., human, or self-driving), a common capacity (e.g., four adults) and a variable capacity (e.g., two minors in a third-row jump seat or four suitcases). Likewise, such characteristics may vary over a period, such as availability during certain hours of a day or week and otherwise. The third characteristic 138 may be configured to update, dynamically, real-time, or on some other schedule, interval, or basis to reflect a status of such service and the characteristics of such service. It is to be appreciated that one or more of the characteristics associated with a service may be private, public, quasi-private (e.g., where dissemination is limited to certain person), or otherwise.

For example, a transportation service provider may include a third record 136 that specifies that a given vehicle has a characteristic of being handicap accessible. The third record 136 may be directly or indirectly accessible by the first application 102. A third characteristic 138 may further designate such vehicle, as identified by the third record 136, as being electric wheel-chair accessible. The first application 102 may be configured to interface with second application 130 such that a social fitness event requiring transportation of a wheel-chair bound person can be scheduled to include the use of an appropriate vehicle.

Further, the first application 102 may be configured to facilitate the providing of the service. For example, the first application 102 may be configured to provide reminders, directions, or other information to the transportation service provider and/or the vehicle/driver/service designated for use in furtherance of the given social fitness event. Likewise, monitoring of the providing of such service may also be facilitated by the first application 102. For example, the first application 102 may be configured to provide updates to the wheel-chair bound person as to the estimated time of arrival of the transportation service, thereby minimizing inconveniences that might otherwise arrive by such person's waiting. Similarly, the first application 102 may be configured to monitor the event such that the scheduling of a return trip, by the vehicle, is dynamic. For example, by monitoring when a restaurant serves desert, the first application 102 could be configured to estimate an end-time for the event and thus anticipate when the need will arise for return transportation services. It is to be appreciated that for at least one embodiment, the first application 102 may be configured to both organize and facilitate a social fitness event, where facilitating the event includes, but is not limited to, configuring devices, services and facilities both prior to, during and after the event, such that the event desirably proceeds as desired or as modified real-time in view of then arising conditions in devices, persons, services, facilities, or otherwise. Examples of activities the first application 102 may be configured to facilitate include setting a temperature for a room in which an event is to occur, adjusting the temperature as the event occurs (e.g., is the room to hot or too cold?), and resetting the temperature to a desired minimum or maximum after the event has ended. IoT and other types of devices can be used in such facilitating of an event.

Further, it is to be appreciated that the providing of a service may not involve the use of one or more third-parties. For example, the providing of a transportation service for a person may involve the use of private vehicle, such as one owned or controlled by another person attending the event. The first application 102 may be configured to facilitate, organize, and monitor the providing of such services, regardless of whether such service involves the use of private or public service providers. Organizing, for example, may include selecting a vehicle having the desired characteristics. Facilitating, for example, may include ensuring the vehicle has the needed fuel or stored energy potential for the anticipated trips and rerouting the vehicle, real-time, in view of traffic, weather, or other variables. Monitoring, for example, may include tracking the vehicle as it proceeds in support of the event. Obtaining Feedback, for example, may include soliciting the feedback of passengers in such vehicle.

As further shown in FIG. 1, the system 100 may also include the configuring and use of one or more third applications 140. As used herein for descriptive purposes only and not in a limiting manner, a third application 140 may be utilized to provide information and access to facilities that are otherwise maintained and/or controlled by a third-party entity and not directly by an entity operating or configured to operate in conjunction with the first application 102. For example, the system 100 may include access to pre-existing facility providers, such as hotels, restaurants, event halls, and otherwise. The third application may access these pre-existing facility applications 102, via the Internet or other communications medium(s), to facilitate, organize, monitor, and obtain feedback for social fitness events. For example, when organizing an event, a need may be recognized for use of a facility suitable to hold a given number of persons for the event. The first application 102 may be configured to identify a third application 140 providing access to such facilities, establish communications with a third server 142 executing, in whole or in part, such a third application 140, and reserve the desired facilities. When facilitating, audio-visual equipment during an event may be controlled, directly or indirectly, by the first application 102. While monitoring an event, the temperature may be senses, lighting monitored, status of exits, or attributes monitored. And, feedback may be obtained, at any time, about the facility or characteristics thereof.

It is to be appreciated that such facilities may designated in one or more third databases 144. Such third databases 144 may include one or more fourth/facility records 146 that are associated with a given facility and have one or more fourth/facility characteristics 148 associated therewith. Non-limiting examples of such fourth characteristics 148 may include a facility type, capabilities, an identifier, directions to the facility, one or more use rights or conditions, permissions, availability, and other characteristics. It is to be appreciated that the fourth characteristics 148 associated with a given facility, as designated by a fourth record 146, may be unique or generic to such facility and may be fixed, configurable, or vary over time. For example, a size of a room, such as a ballroom at a hotel, may specify a first capacity (e.g., ten person) and a variable capacity (e.g., up to 100 persons), where the additional capacity may be obtained by removing walls, barriers, or the like. Likewise, such a characteristic may vary over a period, such as availability during certain hours of a day, or days of a week, and otherwise. A characteristics, such as availability, may vary as demand for the facility rises and falls. The fourth characteristic 148 may be configured to update, dynamically, real-time, or on some other schedule, interval, or basis to reflect a status of such facility and the characteristics thereof. It is to be appreciated that one or more of the characteristics associated with a facility may be private, public, quasi-private (e.g., where dissemination is limited to certain person), or otherwise.

For example, a conference service provider, such as a hotel, may include a fourth record 146 that specifies that a given facility (hotel room) is handicap accessible. The fourth record 146 may be directly or indirectly accessible by the first application 102. A fourth characteristic 148 may further designate such room, as identified by the fourth record 146, as being electric wheel-chair accessible. The first application 102 may be configured to interface with fourth application 140 such that a social fitness event requiring attendance by a wheel-chair bound person and overnight lodging can be scheduled to include the use of an appropriate hotel room.

Further, the first application 102 may be configured to facilitate the providing of the facility. For example, the first application 102 may be configured to provide reminders, directions, or other information to the transportation service provider and/or persons attending the event as to the location of the facility, unique rules or requirements, and the room reserved for such person. Access codes and the like may be provided to such person's phone or other device to facilitate access to the room. Other services may be provided to facilitate and further the person's enjoyment of the given social fitness event. Likewise, monitoring of the providing of such facility may also be facilitated by the first application 102. For example, the first application 102 may be configured to provide updates to the wheel-chair bound person and/or the hotel as to the estimated time of their arrival and departure, thereby minimizing inconveniences at check-in and check-out. Similarly, the first application 102 may be configured to monitor the event and the providing of the facility dynamically. It is to be appreciated that the various embodiments of the present disclosure may be configured to include a first application 102 that is communicatively coupled to two or more other second, third or other provider applications in furtherance of at least one of facilitating, organizing, monitoring, and obtaining feedback for a social fitness event.

For at least one embodiment, the system 100 may also be configured to gather, collect, process, analyze, and disseminate feed-back from persons attending a social fitness event. Such feedback may arise real-time or otherwise. Such feedback may originate from any source, such as a person's inputs, bio-metric sensors, or other sensors. For example, an athletic event, such as a marathon or bike race, may indicate real-time the location of a given set or sub-set of participants. Such information may be utilized by event facilitators and other providers of the event to have assistants available at certain aid stations and not others. Likewise, the staging of medical or other support personnel may be organized on a real-time basis, using the first application, thereby relieving race directors and others from such commonly manually performed responsibilities.

Figure 2:
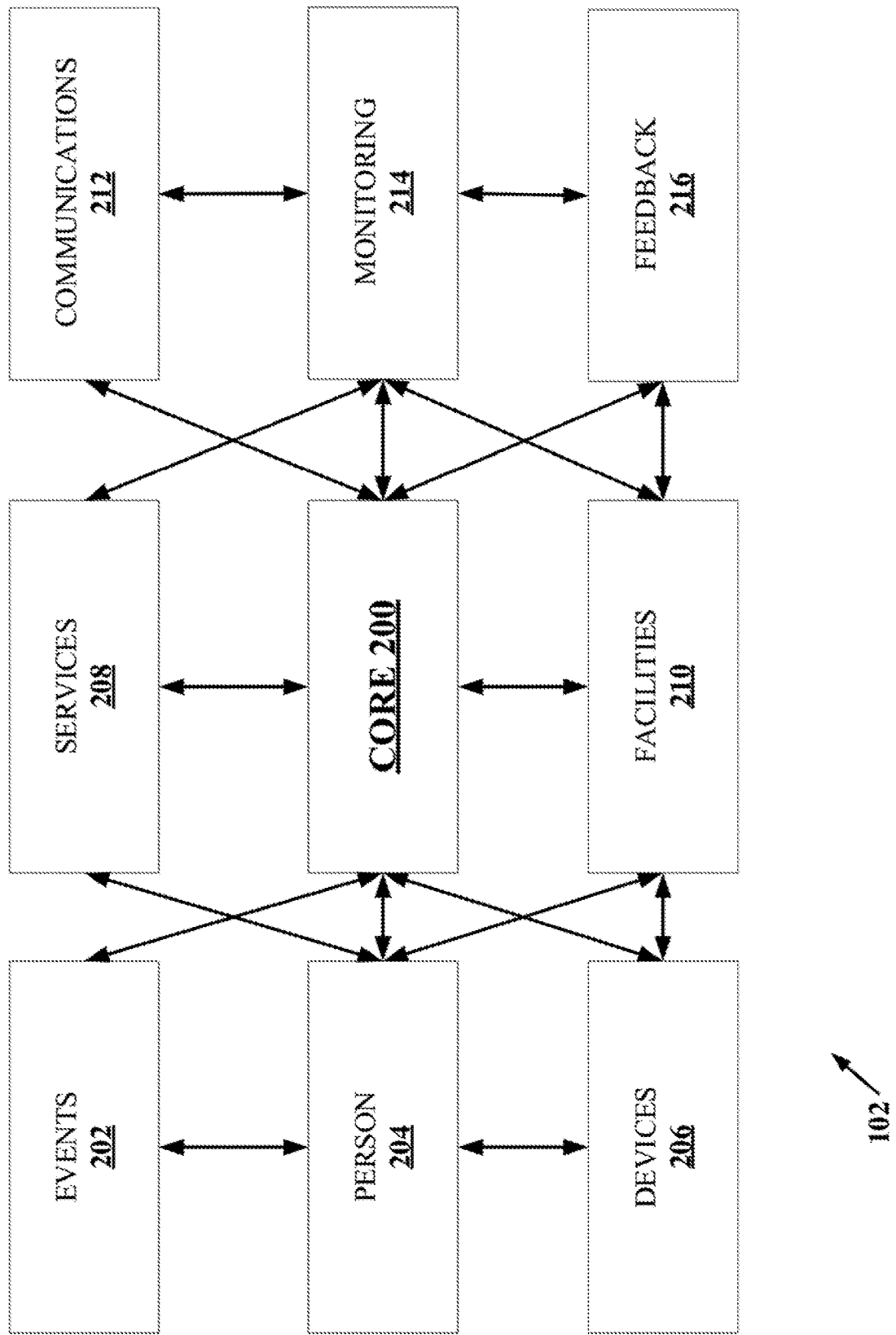
FIG. 2 is schematic representation of software modules utilized in a social fitness application and in accordance with at least one embodiment of the present disclosure.

As shown in FIG. 2 for at least one embodiment of the present disclosure, the first application 102 may be configured to include a core module 200. The core module 200 may include computer software code having one or more executable instructions written in any computer language for use with any desired operating system. In accordance with at least one embodiment, the core module 200 is written in the C++ computing language and is configured for execution on a computing device executing the UNIX, MAC OS, WINDOWS OS, or other operating system. For at least one embodiment, a computing system includes a multi-core, multi-thread central processing unit executing the core module 200. It is to be appreciated that the processing operations accomplished by the core module 200 may be performed using a centralized or distributed computing architecture. For at least one embodiment, the core module 200 is responsible coordinating the overall functionalities of the first application 102.

The first application 102 may also include one or more of an event module 202, a person module 204, a devices module 206, a services module 208, a facilities module 210, a communications module 212, a monitoring module 214 and a feedback module 216. One or more of these modules and/or other modules may be used in conjunction with one or more embodiments of the present disclosure. One or more, and in at least one embodiment, each of the modules 202/204/206/208/210/212/214/216 may include computer software code having one or more executable instructions written in any computer language for use with any desired operating system. In accordance with at least one embodiment, the modules are written in the C++ computing language and is configured for execution on a computing device executing the UNIX, MAC OS, WINDOWS OS, or other operating system. The computing language, operating system and/or processing units executing a first module, such as the core module 200, may be the same or different than those facilitating a second module, such as the events module 202. Each of the modules may be communicatively coupled, indirectly or directly, to one or more other modules, such as to core module 200 using any know or later arising communications and/or connectivity technologies. As shown in FIG. 2, representative, but non-limiting, connections between modules are shown for purposes of illustration only.

For at least one embodiment, the event generator module 202 is responsible for identifying social fitness events. More specifically, the event generator module 202 may be configured to monitor one or more news feeds, event feeds, program guides, TWITTER, SNAPCHAT and other social media feeds, promotions (such as by restaurants, hotels, airlines, event vendors, concert promoters or otherwise) to identify events. Such feeds may be provided to the events module 202 by the core module 200 and by use of the communications module 212. The event generator module 202 may be configured to monitor for any type of event, using any information source.

As further shown in FIG. 2, the first application 102 may include a person module 204. The person module 204 may be configured to interface with the first database 106, one or more first records 108 and one or more first characteristics 110, and with the events module 202, to identify one or more persons that may be interested in attending an event. The person module 204 may be configured to provide prompts or requests to the events module 202, such that the events module 202 is configured to search and identify when certain events arise that are of interest to two or more persons, as identified in a given first characteristic 110 for a respective given first record 108. For example, a first characteristic associated with each of the first person 150, the second person 154 and the third person may indicate that each of such persons are associated with the other and have an interest in a given sports team. The events module 202 may accordingly be configured to search for and identify when the next game arises for that team and, using the communications module 212 identify such event to such persons and obtain an indication of such persons' interest in attending a watch event for the next game by such team.

As further shown in FIG. 2, the first application 102 may include a devices module 206. The devices module 206 may be configured to identify devices that may be used in furtherance of a given social fitness event. For the sports team watch event example, the devices module 206 may be configured to recognize that certain devices are needed for the event, such as a television, furniture, food, drinks, and the like. The devices module 206 may be configured to have certain rules, relationship tables and the like which interface with a second/device characteristic 114 to identify those devices that are or may be available for the given event. More specifically, the devices module 206 may be configured to recognize that for a football watch event a big screen television is desired. The devices module 206 may be further configured, based on inputs provided by the events module 202 and the person module 204, and characteristic records associated therewith, that the first person 150 possesses a suitable television and his television is not otherwise reserved for another event (e.g., another television program) during the date/time of the football watch event. The device module 206, in conjunction with the core and person modules, may be configured to reserve the device—the big screen television—for the sports game watch event.

In a similar manner, the devices module 206 may be configured to designate other persons attending the event to provide other goods or services, such as additional chairs, food, beverages, or the like. The devices module 206 may be configured to so designate goods to be provided by a person based upon one or more first or second characteristics 110/114 associated with one or more first or second records 108/112. For example, a smart-refrigerator device associated with the second person 154 may be configured to monitor the quantity and type of alcoholic beverages then available in such refrigerator. Such monitoring may occur using IoT tags, manual entry, or otherwise. Accordingly, the devices module 206 may be configured to designate the second person 154 to provide the beverages that are compatible with the preferences of the other attendees—such preferences being designated as one or more corresponding first characteristics 110.

As further shown in FIG. 2, the first application 102 may also include a services module 208. The services module 208 may be configured to identify services that may be used in furtherance of a given social fitness event. For the sports game watch event example, the services module 208 may be configured to recognize that certain services are needed for the event, such as pizza delivery, designated drivers, and the like. The services module 208 may be configured to have certain rules, relationship tables, and the like which interface with one or more third records 136 and third characteristics 138 to identify those services that are or may be available and/or needed for the given event. More specifically, the services module 208 may be configured to recognize that for a sports game watch event, fresh and hot pizza is desired. The services module 208 may be further configured, based on inputs provided by the events module 202 and the person module 204, and characteristic records associated therewith, to determine that the first person 150 likes any type of pizza while the third person 158 requires glutton free pizza. Based upon such characteristics, the services module 208, in conjunction with the core and person modules, may be configured to order suitable pizza for the sports game watch event.

In similar manner, the services module 208 may be configured to designate other services needed for the event, such as transportation, security (e.g., for large events or events where an attendee requires a security detail), or otherwise. The services module 208 may be configured to so designate based upon one or more second characteristics 114 associated with one or more second records 112.

As further shown in FIG. 2, the first application 102 may also include a facilities module 210. The facilities module 210 may be configured to identify facilities that may be used in furtherance of a given social fitness event. For the football watch event example, the facilities module 210 may be configured to recognize that a certain sized facility is needed for the event based upon the number and characteristics of the persons attending. The facilities module 210 may be configured to have certain rules, relationship tables and the like which interface with one or more fourth records 146 and fourth characteristics 148 to identify the characteristics of a given facility that are or may be available for the given event. More specifically, the facilities module 210 may be configured to recognize that a sports game watch event with three attendees can be accommodated in the first person's living room. However, when twenty people are to attend, such facility is insufficient and a larger facility, such as a private room at a restaurant or otherwise may be needed. The facilities module 210 may be further configured, based on inputs provided by the events module 202, the person module 204, the devices modules 206, and the characteristic records associated therewith, to determine that the first person 150 likes a given facility, but, dislikes another. Based upon such characteristics, the facilities module 210, in conjunction with the core, person, device and services modules, may be configured to identify and reserve, as necessary, a suitable facility for the football watch event. It is to be appreciated, that the facility identified may include one or more facility characteristics 148 that identify and/or specify devices available, the number of persons that can attend, the services needed, permissible event types, and otherwise. Accordingly, the core module 200 may be configured to utilize one or more rules, conflict resolution procedures, preferences, or the like to deconflict conflicts arising between events, persons, devices, services, and facilities to organize and facilitate a given social fitness event.

Further, the facilities module 210 may be configured to designate other facilities needed for the event, such as restroom facilities, the staging of security (e.g., for large events or events where an attendee requires a security detail), catering or otherwise, and other aspects of the event. The facilities module 210 may be configured to so designate based upon one or more fourth characteristics 148 associated with one or more fourth records 146.

As further shown in FIG. 2, the first application 102 may also include a communications module 212. The communications module 212 may be configured to communicate directly and/or indirectly with one or more of the other modules. For one embodiment, such communications may arise via the core module 200. The communications module 212 may be configured to interface with any communications hardware, software, networks, topologies, technologies or otherwise to facilitate communications between the first application 102 and one or more second applications 130 or third applications 140 and with one or more persons via their corresponding devices. The communications module 212 may also be configured to provide connectivity between the first application 102 and any modules associated therewith and any of the second or third applications. As discussed above, such second or third applications may be provided on separate servers, networks, or otherwise.

As further shown in FIG. 2, the first application 102 may also include a monitoring module 214. The monitoring module 214 may be configured to monitor an event, before, during, and after it occurs, such that involvement of persons attending the event can be minimized in the logistics of the event. For example, the monitoring module 214 may be configured to interface with a devices module to monitor the beer and pizza supply during the sports game watch event, with the monitoring module 214, via the communications and services module, ordering additional beer and/or pizza as the event progresses and as persons arrive/do not arrive.

As further shown in FIG. 2, the first application 102 may also include a feedback module 216. The feedback module 216 may be configured to monitor an event, before, during, and after it occurs, and afterwards such that logistical involvement of persons attending the event can be minimized, while the logistics of the event and future events can be improved. For example, the feedback module 216 may be configured to interface with a devices module to monitor the temperature in the room and based upon attendee's feedback adjust the temperature accordingly. Similarly, the feedback module 216 may be configured to solicit or obtain feedback on devices, persons, facilities, services, and events. The first application 102 may utilize such feedback for any purpose including facilitating and organizing future events. Last, it is to be appreciated that other modules may be utilized in conjunction with a first application to facilitate, organize, monitor, and/or generate feedback for social fitness events.

Figure 3:
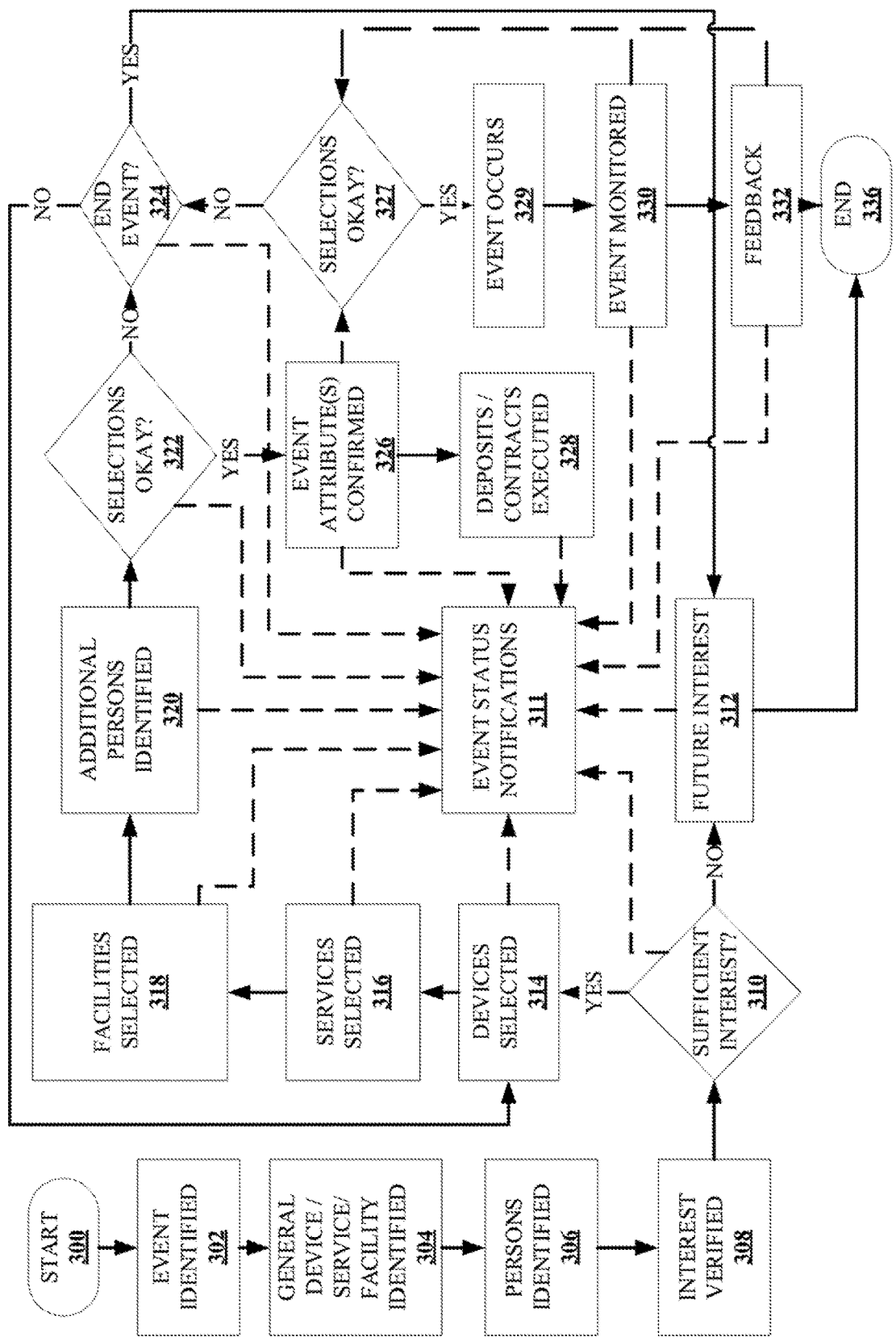
FIG. 3 is a flow chart depicting a process for use of a social fitness application and in accordance with at least one embodiment of the present disclosure.

In FIG. 3, one embodiment of a process is shown for facilitating, organizing, monitoring, and obtaining feedback for a social fitness event. As shown, the process may include various operations that may occur in various progressions. The process generally begins when a social fitness application, such as the first application 102, is activated (Operation 300). It is to be appreciated that such activation may occur manually, semi-automatically or automatically. As shown in FIG. 3, the process may begin with the identification of an event (Operation 302). It is to be appreciated, however, that the process may begin for other embodiments with the identification of two or more persons whom have not engaged, within some past period, and/or need or may desire to engage in a social fitness event. The identification of such two or more persons may include the subsequent operations of identifying events of interest to both two or more persons. Likewise, the process may begin with the identification of devices needing to be used, for example, a first person's supply of certain food or beverages may need to be consumed, thus, prompting a need for a social fitness event to facilitate such consumption. Accordingly, it is to be appreciated that the various embodiments of the present disclosure may be configured to occur in any order, as desired for a given implementation.

As shown in FIG. 3, for at least one embodiment, upon identification of an event (per Operation 302), the attributes for the event may be initially identified on a top-level or general basis. Attributes of an event may include devices, services, facilities and otherwise (Operation 304). Likewise, two or more persons to attend the event may be identified (Operation 306). The identification of persons to attend an event may be a determining factor of the event type, device, services, facilities, and other attributes for the event. That is, the persons to attend may play a driving or leading role in determining which services are generally needed, such as handicap transportation services for the previously discussed example above.

In other embodiments, the event itself may drive the initial determination of an event's attributes. For example, a concert by a favored band of the first person 150 may result in a determination of the event occurring, at least with respect to that first person 150, but, the tickets purchased, and other attributes and logistics for the event may be initially and ultimately determined based upon preferences of the second person 154 and, if any, third person 158. For example, a second person 154 not desirous of having standing room floor general admission tickets may be accounted for by the first application 102 and the process of FIG. 3 in determining the type of tickets ultimately pursued for the show, and/or the second persons to invite to the show with the first person. It is to be appreciated that the first application 102 may be configured to generate various initial scenarios of attributes for an event. Such scenarios may be selectable by one or more persons identified as potential participants in the event. One or more such persons may have a determining role in the type of event. In other embodiments, a collective approach may be used where every person identified may have an equal or quasi-equal voice in the event type and attributes thereof.

As shown in Operation 308, the process may continue with a gauging or survey of persons for their interest in the event, as generally identified as having certain attributes per operations 302-306. The process of interest verification may occur by any mechanism, using any known or later arising communications technology. The interest verification process may occur privately, semi-privately, publicly, anonymously, or otherwise. For example, an initial interest verification for an event including each of the first, second and third persons, may include a feedback option whereby a person may indicate a desirability or lack thereof to attend such event with one or more of such other persons, or other attributes, including the type of event itself. Other processes for person interest verification may be utilized. It is to be appreciated that for at least one embodiment, such interest may be obtained prior to identification of the event (per operation 302) or after identification of the event.

As per Operation 310, a determination is made of whether sufficient interest exists in the event. Such determination may be made, for example, in the view of an indication of interest by one or more persons who may be deemed essential to an event. For example, a birthday party event typically requires the willing participation of the birthday person, unless the party is a surprise. If such person is unavailable or unwilling to attend, for any or no reason, such an event is non-practical.

If sufficient interest does not exist, the operation may proceed with one or more of notifying solicited persons of the event status (Operation 311), soliciting feedback from one or more persons for future interest in the event (Operation 312), and terminating the process with respect to the event identified per operation 302 (Operation 336).

If sufficient interest in the event exists, an iterative process may be utilized to determine the formal (as opposed to initial or preliminary) attributes of the event; where for at least one embodiment the persons attending the event have already been identified and initially confirmed per operations 306-308-310. The determination of the formal attributes of the event may occur in any order. As shown in FIG. 3, for at least one embodiment, the process may include: (Operation 314) selecting devices, (Operation 316) selecting services, (Operation 318) selecting facilities, and (not shown) selecting any other attributes needed for the event. Upon selection of any one or more of such device, services, facilities, or otherwise, notifications may be provided to one or more persons, device providers, services providers, facility providers, or otherwise that such device, service, facility, or otherwise has been identified for use in the event (Operation 311). It is to be appreciated that the process of selecting attributes (i.e., devices, services, facilities, otherwise) for an event may also involve the selection or identification of additional or alternative persons to attend the event (Operation 320). Likewise, indications of interest in the event (per Operation 308) may arrive at different times. The process may include (Operation 322) performing verifications on a real-time, periodic, or other basis as to whether one or more of the formally selected event attributes are acceptable (okay) in view of the event type, the persons having indicated their attendance, or withdrawal of attendance (as the case may be), and other attributes of the event. That is, for at least one embodiment, an iterative process may be used to formally select event attributes. Such iterative process (Operations 324-314-316-318-320-322) may repeat as desired for any given embodiment, until a go/no-go decision is required, typically at a certain date and/or time prior to the event (Operation 324). It is to be appreciated the go/no-go time may vary by event, factors beyond control of event planners, such as weather, illness, or otherwise. Further, it is to be appreciated that the iterative process, if needed, may not involve re-determinations of every type of event attribute. For example, a selection of a facility may occur with selections of transportation service providers occurring later.

As shown in Operation 326, when selections of one or more event attributes are confirmed (per Operation 322), the process may continue with subsequent verifications that such selections are acceptable (Operation 327). As appropriate, deposits are made, contracts executed, and/or similar binding obligations may occur (per Operation 328). It is to be appreciated that such events will often be attribute specific, with different attributes having varying commitment timelines and obligations, if any. For at least one embodiment, the first application 102 may be configured to manually, semi-automatically or automatically execute and enter into such binging commitments.

As shown in Operation 329, the event may occur with a given set of attributes. For at least one embodiment, the process may include operation of one or aspects of the event. For example, the process may include facilitating the event by pre-selecting or selecting during the event a television to the proper feed such that the desired sports game event is presented on the television, at the desired time. Further, the process may include monitoring of the event as it occurs (Operation 330). Such monitoring may include use of any known or later arising technologies. Based on the monitoring, determinations may be made, on any time basis, as to one or more of the events attributes are still acceptable or need modification. As discussed above, any one or more of the operations of organizing, facilitating, monitoring, and obtaining feedback for an event can arise at any time, in any order, coextensively, individually, or otherwise.

If a change in the event (per Operation 330) is needed, an iterative process may be used to select additional, fewer, alternative, new or other attributes. For example, the process may be configured to select additional transportation services on a real-time or as needed basis for an event where more than an anticipated number of attending persons require designated drivers.

As shown in Operation 332, the process may also include the collection of feedback. Such feedback may occur at any time, for any given embodiment, and during any phase of event such as the initial phase (Operations 302-310), formal planning phase (Operations 314-322), final phase (Operations 326-327-328), and execution phase (Operations 320-330). Further, it is to be appreciated that one or more iterative processes may be used for event attribute selection and management during any phase of the process. As shown in Operation 336, the event eventually ends after any desired feedback is collected. As further shown, the process may include the providing of event status notifications to persons, third-party providers, and others during any and/or all phases of the process. Such notifications may common to all, specific to certain persons, specific to certain providers or otherwise.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A system, comprising:
   a first database;
   a processor, coupled to the first database and an events database, and having access to one or more non-transitory processor readable instructions, wherein the processor readable instructions comprise:
      a first application configured to instruct the processor to perform computer executable operations comprising:
         identifying an event;
            wherein the event is listed in the events database and includes an event characteristic;
         identifying, using the first database, a first person and a second person;
         verifying, using the first database, the first person and the second person are interested in attending the event; and
         facilitating the event for the first person and the second person;
      wherein the first database includes two or more first records;
      wherein a first-first record uniquely identifies the first person;
      wherein a second-first record uniquely identifies the second person;
      wherein each of the first-first record and second-first record includes a first characteristic;
         wherein the first characteristic includes a calendar;
         wherein the first characteristic includes a preference for events matching the event characteristic;
   a communications interface coupling the processor to the events database; and
   a second database including a second record;
      wherein the second record uniquely identifies a first device;
      wherein the second record includes a second characteristic;
         wherein the second characteristic indicates a device type; and
      wherein the first application is configured to instruct the processor to perform computer executable operations comprising:
         determining a device type useful in facilitating the event; and
         when the second characteristic for the device matches the determined device type useful in facilitating the event, selecting the first device for use during the event.

2. The system of claim 1,
   wherein the second characteristic includes at least one permission identifying whether at least one of the first person and the second person have access to the device; and
   wherein the first application is configured to instruct the processor to perform the selecting operation in view of the at least one permission.

3. The system of claim 2, comprising:
   a third database, coupled to the processor, including a third record;
      wherein the third record uniquely identifies a first service;
      wherein the third record includes a third characteristic;
         wherein the third characteristic indicates a service type provided by the first service; and
      wherein the first application is configured to instruct the processor to perform computer executable operations comprising:
         determining a service type useful in facilitating the event; and
         when the service characteristic for the service matches the determined service type useful in facilitating the event, selecting the first service for use during the event.

4. The system of claim 2, comprising:
   a fourth database, coupled to the processor, including a fourth record;
      wherein the fourth record uniquely identifies a first facility;
      wherein the fourth record includes a fourth characteristic;
         wherein the fourth characteristic indicates a facility type; and
      wherein the first application is configured to instruct the processor to perform computer executable operations comprising:
         determining a facility type useful in facilitating the event; and
         when the fourth characteristic for the facility matches the determined facility type useful in facilitating the event, selecting the first facility for use during the event.

5. The system of claim 4, wherein the communications interface couples the processor to the third database and to the fourth database over a wide area network.

6. The system of claim 4, wherein a second device is available for use during the event;
   wherein a second-second record identifies the second device;
   wherein the second-second record includes each of the second characteristics;
   where the second characteristics include an availability identifier; and
   wherein the first application is configured to instruct the processor to perform computer executable operations comprising:
      selecting at least one of the first device and the second device based upon the availability identifier associated with each of the first device and the second device.

7. The system of claim 6, wherein a second service is available for use during the event;
   wherein a second-third record identifies the second service;
   wherein the second-third record includes at least one of the third characteristics;
   where the third characteristics include an availability identifier; and
   wherein the first application is configured to instruct the processor to perform computer executable operations comprising:

selecting at least one of the first device, the second device, the first service, and the second service based upon the availability identifiers associated with respectively each of the first device, the second device, the first service, and the second service.

8. The system of claim 7, wherein a second facility is available for use during the event;
wherein a second-fourth record identifies the second facility;
wherein the second-fourth record includes at least one of the fourth characteristics;
where the fourth characteristics include an availability identifier; and
wherein the first application is configured to instruct the processor to perform computer executable operations comprising:
selecting at least one of the first device, the second device, the first service, the second service, the first facility and the second facility based upon the availability identifiers associated with respectively each of the first device, the second device, the first service, the second service, the first facility and the second facility.

9. The system of claim 7, wherein the first application is configured to instruct the processor to perform computer executable operations comprising:
determining a preference for each of the first person and the second person for each of the first device, the second device, the first service, the second service, the first facility and the second facility; and
determining a best match of devices, services, and facilities in view of the determined preferences for the event.

10. The system of claim 1, wherein the event is a social fitness event.

11. The system of claim 1, wherein the first device is configured with an Internet-of-Things tags.

12. A computer process for organizing a social fitness event, comprising:
executing a first application using:
a processor configured to execute the first application program using one or more computer processor-readable instructions,
an event database identifying one or more event characteristics for at least one event;
a first database identifying one or more first characteristics about two or more persons;
wherein the first database is electronically coupled to the processor;
a second database identifying one or more second characteristics about one or more devices;
wherein each of the one or more devices is electronically coupled to the processor;
a third database identifying one or more third characteristics about one or more services;
wherein each of the one or more services is electronically coupled to the processor; and
a fourth database identifying one or more fourth characteristics about one or more facilities;
wherein each of the one or more facilities is electronically coupled to the processor;
wherein via execution of the first application, the process further comprises the computer processor executable operations of:
initially identifying, from the second database, at least one of the one or more devices for use with the social fitness event;
initially identifying, from the third database, at least one of the one or more services for use with the social fitness event;
initially identifying, from the fourth database, at least one of the one or more facilities for use with the social fitness event;
verifying at least two of the two or more persons are interested in attending the social fitness event; and
wherein upon verifying that at least two of the two or more persons are interested in attending the social fitness event, the process further comprises:
selecting at least one device for use during the social fitness event;
selecting at least one service for use during the social fitness event; and
selecting at least one facility for use during the social fitness event;
wherein the selection of the at least one device, at least one service and at least one facility occurs iteratively in view of at least one first characteristic associated with at least one of the two or more persons interested in attending the event.

13. The process of claim 12, wherein the at least one first characteristic is a preference.

14. The process of claim 13, where the selection of the at least one device occurs in view of at least one second characteristic, wherein the at least one second characteristic is communicated to the processor using at least one IoT tag.

15. The process of claim 12, wherein the process further comprises monitoring the social fitness event as it occurs.

16. The process of claim 15, wherein the process further comprising utilizing feedback from at least one person during at least one of the organizing and an occurrence of the social fitness event.

17. A non-transitory processor-readable medium providing processor-readable instructions configured to cause one or more processors to execute an application program for use in organizing a social fitness event, wherein the processor-readable instructions comprise instructions for execution by the one or more processors in a distributed system having one or more local databases and one or more remote databases, comprising:
an events module, configured to interface with a remote events database including one or more event records;
a person module configured to interface with a local first database including two or more first records, wherein each of the two or more first records identify each of two or more persons;
wherein each of the first records includes at least one first characteristic associated with a person;
a devices module configured to interface with a local second database including at least one second record, wherein each of the at least one second records identifies a device communicatively coupled to the processor using an IoT tag;
wherein each of the second records includes at least one second characteristic associated with a service;
a services module configured to interface with a remote third database including at least one third record;
wherein each of the third records includes at least one third characteristic associated with a facility; and
a facilities module configured to interface with a remote fourth database including at least one fourth record;
wherein each of the first, second and third records are accessible to the processor using at least one computing network.

18. The non-transitory processor-readable medium of claim 17,
wherein the at least one first characteristic is a user preference.

19. The non-transitory processor-readable medium of claim 17,
wherein the at least one second characteristic is communicated to at least one of the one or more processors using the IoT tag.

20. The non-transitory processor-readable medium of claim 17,
wherein the processor-readable instructions further comprise instructions for utilizing feedback from at least one of the two or more persons during at least one of an organizing and an occurrence of the social fitness event.

\* \* \* \* \*